United States Patent
So et al.

(10) Patent No.: US 10,259,271 B2
(45) Date of Patent: Apr. 16, 2019

(54) NOISE-REDUCING APPARATUS FOR TIRE AND TIRE HAVING SAME

(71) Applicant: Hankook Tire Co., Ltd., Seoul (KR)

(72) Inventors: Soon Hong So, Daejeon (KR); Jeong Heon Kim, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 150 days.

(21) Appl. No.: 15/364,116

(22) Filed: Nov. 29, 2016

(65) Prior Publication Data

US 2017/0151839 A1    Jun. 1, 2017

(30) Foreign Application Priority Data

Nov. 30, 2015 (KR) .......................... 10-2015-0168728

(51) Int. Cl.
*B60C 19/00* (2006.01)
*B29D 30/06* (2006.01)
(Continued)

(52) U.S. Cl.
CPC ........ *B60C 19/002* (2013.01); *B29D 30/0681* (2013.01); *B60C 5/14* (2013.01);
(Continued)

(58) Field of Classification Search
CPC ......... B60C 19/002; B60C 19/00; B60C 5/14; B29D 30/0681; B29D 2030/0682
See application file for complete search history.

(56) References Cited

U.S. PATENT DOCUMENTS

| 3,712,362 A | * | 1/1973 | Alderfer | ................. B29D 30/06 152/452 |
| 4,202,392 A | * | 5/1980 | Mineur | .................... B60C 17/10 152/521 |

(Continued)

FOREIGN PATENT DOCUMENTS

| JP | 2002-240507 | 8/2002 |
| KR | 10-2007-0029652 A | 3/2007 |

(Continued)

OTHER PUBLICATIONS

Office Action in Korean Application No. 10-2015-0168728; 8 pages.

*Primary Examiner* — Edgardo San Martin
(74) *Attorney, Agent, or Firm* — Knobbe, Martens, Olson & Bear LLP

(57) ABSTRACT

The disclosed technology generally relates to apparatuses for reducing or cancelling noise generated by a tire in motion, and more particularly to a noise-reducing apparatus including a sound-absorbing foam and a fixing structure for attaching and fixing the sound-absorbing foam to a tire. In one aspect, the noise-reducing apparatus for a tire includes a sound-absorbing foam configured to reduce noise generated by the tire by absorbing sound generated by the tire in motion when attached to an inner liner of a tire. The noise-reducing apparatus additionally includes a plurality of fixing bands configured to fix the sound-absorbing foam to an inner side of the tire. Each of the fixing bands has an attaching portion configured to be fixed to the inner side of the tire and has a pressing portion configured to bring and keep the sound-absorbing foam in contact with the inner liner. The pressing portion is configured to apply an elastic force on the sound-absorbing foam by extending and contracting. The disclosed technology also relates to a tire (Continued)

having the noise-reducing apparatus and a method of integrating the noise-reducing apparatus to a tire.

17 Claims, 13 Drawing Sheets

(51) Int. Cl.
*G10K 11/168* (2006.01)
*B60C 5/14* (2006.01)
*B29K 23/00* (2006.01)
*B29K 105/04* (2006.01)

(52) U.S. Cl.
CPC .... *G10K 11/168* (2013.01); *B29D 2030/0682* (2013.01); *B29K 2023/083* (2013.01); *B29K 2105/04* (2013.01); *B29K 2995/0002* (2013.01)

(56) References Cited

U.S. PATENT DOCUMENTS

| | | | | |
|---|---|---|---|---|
| 6,598,636 | B1 * | 7/2003 | Schurmann | B60C 19/002 152/157 |
| 7,140,412 | B2 * | 11/2006 | Tanno | B60C 19/002 152/450 |
| 7,347,239 | B2 * | 3/2008 | Yukawa | B29D 30/0654 152/209.18 |
| 7,556,074 | B2 * | 7/2009 | Borot | B29D 30/20 152/152.1 |
| 7,717,146 | B2 * | 5/2010 | Yukawa | B60C 19/002 152/151 |
| 7,874,329 | B2 * | 1/2011 | Tanno | B60C 19/002 152/154.1 |
| 8,342,289 | B2 * | 1/2013 | Tanno | B60C 19/002 152/157 |
| 8,439,091 | B2 * | 5/2013 | Tanno | B60C 19/002 152/157 |
| 10,000,096 | B2 * | 6/2018 | Sakakibara | B60C 19/002 |
| 2007/0074798 | A1 | 4/2007 | Tanno et al. | |
| 2009/0266153 | A1 * | 10/2009 | Hironaka | B60C 23/0493 73/146.5 |
| 2011/0083778 | A1 * | 4/2011 | Fowler-Hawkins | B60B 1/06 152/331.1 |
| 2011/0308704 | A1 * | 12/2011 | Sandstrom | B29D 30/0061 156/123 |
| 2011/0308706 | A1 * | 12/2011 | Sandstrom | B29D 30/0061 156/123 |
| 2013/0133800 | A1 * | 5/2013 | Griffoin | B60C 23/0493 152/450 |
| 2013/0248071 | A1 * | 9/2013 | Tanno | B29D 30/0061 152/450 |
| 2016/0303922 | A1 * | 10/2016 | McKinlay | B60C 19/002 |
| 2018/0141392 | A1 * | 5/2018 | Schuermann | B60C 19/002 |

FOREIGN PATENT DOCUMENTS

| | | |
|---|---|---|
| KR | 20-2013-003577 U | 6/2013 |
| KR | 10-1519299 B1 | 5/2015 |
| KR | 10-1535029 | 7/2015 |

* cited by examiner

NOISE-REDUCING APPARATUS FOR TIRE AND TIRE HAVING SAME

CROSS-REFERENCE TO RELATED APPLICATIONS

This application claims priority to and the benefit of Korean Patent Application No. 10-2015-0168728, filed on Nov. 30, 2015, the disclosure of which is incorporated herein by reference in its entirety.

BACKGROUND

Field

The disclosed technology generally relates to apparatuses for reducing or cancelling noise generated by a tire in motion, and more particularly to a noise-reducing apparatus including a sound-absorbing foam and a fixing structure for attaching and fixing the sound-absorbing foam to a tire. The disclosed technology also relates to a tire having the noise-reducing apparatus and a method of integrating the noise-reducing apparatus to a tire.

Description of the Related Technology

Noise can be generated by a tire in motion due to air being repeatedly compressed and expanded in the tire, which is in turn due to vibrations being generated by the tread of the tire being repeatedly compressed and restored. The noise generated by such process is sometimes called the resonance noise. The resonance noise can travel into the interior of a vehicle and heard by the driver and/or passenger(s) as sounds having sharp peaks, thereby degrading the riding experience and comfort. Tire resonance noise has been considered as a severe problem due to a low aspect ratio and inch-up of tires.

Accordingly, studies on the low-noise tire having an acoustic absorbent materials have been recently been conducted. Low-noise tires are generally manufactured by machining an acoustic absorbent material and placing it in the cavity of a tire or attaching it to the rim or the inner liner.

In this respect, a low noise tire composed of a sealant layer attached to the inner side of an inner liner and an acoustic absorbent layer including a polypropylene melt blow fiber and a polymer fiber at a predetermined ratio on the sealant layer has been disclosed in Korean Patent No. 10-1535029 (hereafter, referred to as 'Prior Art 1'). Further, a technology of reducing tire resonance noise in a tire by putting a spherical acoustic absorbent of 40 to 100 mm in a tire without fixing the absorbent has been disclosed in Japanese Patent Application Publication No. 2002-240507 (hereafter, referred to as 'Prior Art 2'). The spherical acoustic absorbent is inserted in a tire cavity, but is not bonded to prevent heat generation. However, adhesive ability has been improved by materials having high resistance against high-temperature heat and improvement of adhesive ability and it is difficult to apply a spherical acoustic absorbent due to reduction of the tire cavity, as the aspect ratio of tires has been recently decreased. Further, when a tire is rotated without the acoustic absorbent fixed, the spherical shape may be deformed or unbalance may be caused.

SUMMARY OF CERTAIN INVENTIVE ASPECTS

According to the Prior Art 1, an acoustic absorbent is attached to the inner side of a tire by forming an adhesive sealant layer. However, when an acoustic absorbent is bonded through a sealant layer, the sound-absorbing foam can be separated from the inner side of the tire due to high-temperature heat or external force that may be generated while a vehicle is in motion. Further, there are difficulties in a process of applying a sealant to a green tire manufactured through a tire forming process and in a process of separating the green tire from a vulcanizing mold after vulcanizing the green tire in the vulcanizing mold. Further, according to the Prior Art 2, an acoustic absorbent is provided in a tire cavity without a specific fixing member, but in this configuration, other parts in the tire may be damaged and the internal spaces of tires are decreased due to a low aspect ratio of tires, so it is difficult to apply this configuration to tires.

Accordingly, an object of the disclosed technology is to provide a technology about a fixing structure that can reduce noise that is generated in a tire by firmly fixing a sound-absorbing foam to the inner side of a tire, without interfering with a manufacturing process of a tire.

The technical subjects to implement in the disclosed technology are not limited to the technical problems described above and other technical subjects that are not stated herein will be clearly understood by those skilled in the art from the following specifications.

In order to achieve the objects, an embodiment of the disclosed technology provides a noise-reducing apparatus for a tire including a fixing structure for attaching a sound-absorbing foam to the inner side of a tire using a fixing band. In some embodiments, the fixing structure includes: a sound-absorbing foam attached to an inner liner of a tire; and a plurality of fixing bands made of an extendable material and having an attaching portion fixed to the inner side of the tire and a pressing portion bringing and keeping the sound-absorbing foam in contact with the inner liner, in which the pressing portion presses down the top of the sound-absorbing foam by extending and contracting.

The sound-absorbing foam may be continuously attached circumferentially throughout the inner liner or two or more sound-absorbing foams may be continually attached circumferentially to the inner liner.

A plurality of fixing bands may be attached around the tire with regular angular gaps of 5 to 180°.

The attaching portion may be formed at both sides of the fixing band, and the attaching portion attaches the sound-absorbing foam by being attached at both ends, or at both sides of a shoulder, or at both sides of a sidewall of the inner liner of the tire.

The fixing band may be formed in the shape of any one of an ellipse, a circle, a concave shape, and a rectangle.

The fixing band may be made of the same material as the inner liner, or may be made of at least one or more homopolymers selected from a group of EVA (Ethylene vinyl acetate), synthetic resin, natural resin, and urethane, or copolymers of monomers of them.

The fixing band may have a width of 0.5 to 30 mm and a thickness that is 20 to 120% of the thickness of the inner liner.

The attaching portion and the inner side of the tire may be attached or integrated by a bonding process or a fusing process.

The attaching portion and the inner side of the tire may be attached or integrated by vulcanization, and an anti-pressing portion-tire attachment structure may be provided under the pressing portion before vulcanization in order to prevent the surface of the pressing portion and the inner side of the tire from being attached to each other in the vulcanization.

The anti-pressing portion-tire attachment structure may be made of a high-temperature polymer that is not melted at a temperature for vulcanization.

In order to achieve the objects, another embodiment of the disclosed technology provides a method of integrating the noise-reducing apparatus to a tire using the fixing structure. The method includes: i) extending upward the sound-absorbing foam fixing band by applying force to the pressing portion; ii) putting the sound-absorbing foam under the pressing portion; iii) applying pressing force to the sound-absorbing foam by contracting the fixing band by removing the force extending the fixing band; iv) keeping the fixing band in contact with the sound-absorbing foam and the inner side of the tire; and v) positioning the sound-absorbing foam under the pressing portion of an adjacent fixing band by extending upward the adjacent fixing band, in which these steps are repeated until the sound-absorbing foam is attached circumferentially throughout the tire.

The method may further include applying a temporal- or permanent-fixing adhesive to a portion of the fixing band or the sound-absorbing foam before extending upward the fixing band by applying force to the pressing portion.

Further, a tire of the disclosed technology may include the fixing structure, so it is possible to reduce noise that is generated in the tire.

DETAILED DESCRIPTION OF CERTAIN ILLUSTRATIVE EMBODIMENTS

Figure 1A:
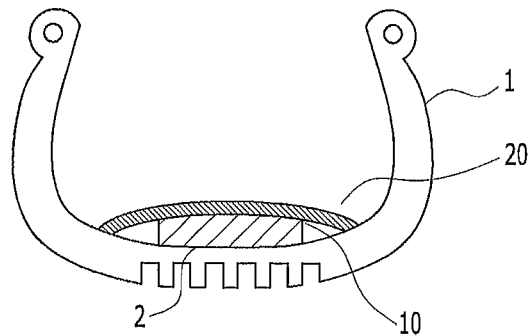
FIGS. 1A-1C are cross-sectional views illustrating noise-reducing apparatuses for a tire having a sound-absorbing foam attached to the tire using a fixing band attached at different positions, according to various embodiments.

Hereinafter, the disclosed technology will be described with reference to the accompanying drawings. However, various inventive aspects of the disclosed technology may be achieved in various different ways and is not limited to the embodiments described herein. In the accompanying drawings, portions not related to the description will be omitted in order to obviously describe the disclosed technology, and similar reference numerals will be used to describe similar portions throughout the present specification.

Throughout this specification, a case in which any one part is connected (coupled, contacted, coupled) with the other part includes a case in which the parts are directly connected with each other and a case in which the parts are indirectly connected with each other with other elements interposed therebetween. Further, unless explicitly described otherwise, "comprising" any components will be understood to imply the inclusion of other components rather than the exclusion of any other components.

Terms used in the present specification are used only in order to describe specific exemplary embodiments rather than limiting the present invention. As used herein, the singular forms are intended to include the plural forms as well, unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, exemplary embodiments of the present invention will be described in more detail with reference to the accompanying drawings. The same components are given the same reference numerals in the drawings and repeated description is not provided for the same components.

The disclosed technology relates to a noise-reducing apparatus for a tire for fixing a sound-absorbing foam 10 to the inner side of a tire in order to reduce noise in a tire and the structure largely includes a sound-absorbing foam 10 attached and fixed to an inner liner 2 of a tire and a plurality of fixing bands 20 keeping the sound-absorbing foam in contact with the inner liner. As described herein and throughout the specification, an inner liner 2 may be a separate liner, which may be detachable and configured to be in contact with an inner surface of the tire, according to some embodiments. According to some other embodiments, however, the inner liner 2 may be formed of an integrated liner material formed as an integral part of an inner wall of the tire.

Components of the disclosed technology are described in detail hereafter.

In the disclosed technology, the sound-absorbing foam 10 may be circumferentially attached to the inner liner to reduce resonance noise that is generated in a tire. The sound-absorbing foam 10 may be circumferentially continuously attached throughout the inner liner 2, as in FIG. 3A, or a plurality of sound-absorbing foams 10 may be circumferentially continually attached to the inner liner 2, as shown in FIG. 3B. Considering the efficiency in a manufacturing process of a tire, when a plurality of sound-absorbing foams are provided, the more the sound-absorbing foams 10, the more the time it takes to attach and fix the fixing bands 20, so it is preferable to continuously attach the sound-absorbing foam 10 circumferentially to the inner liner 2.

Figure 2A:
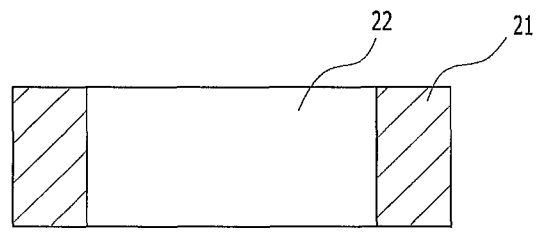
FIGS. 2A-2C are plan-view illustrations of fixing bands, according to various embodiments.
Figure 2B:
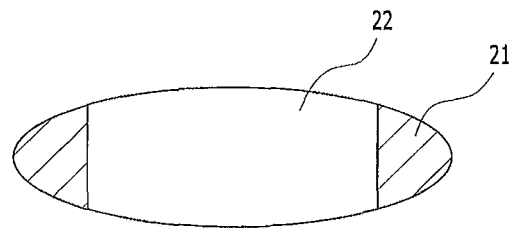
Figure 2C:
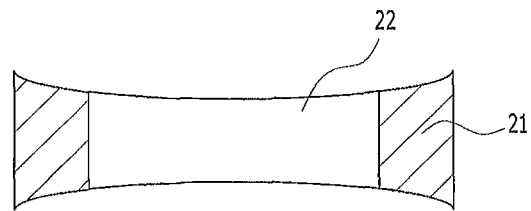

FIGS. 2A-2C are plan view illustrations of fixing bands according to various embodiments of the disclosed technology. In the illustrated embodiments, the fixing bands 20, which are provided to attach and fix the sound-absorbing foam 10 to the inner liner 2 or an inner surface of a tire, have an attaching portion 21 that is fixed to the inner side of a tire and a pressing portion 22 that keeps the sound-absorbing foam 10 in contact with the inner side of a tire by pressing down the top of the sound-absorbing foam 10. Further, referring to FIGS. 2A-2C, the attaching portion 21 may be formed at both sides of the fixing band 20.

Figure 1B:
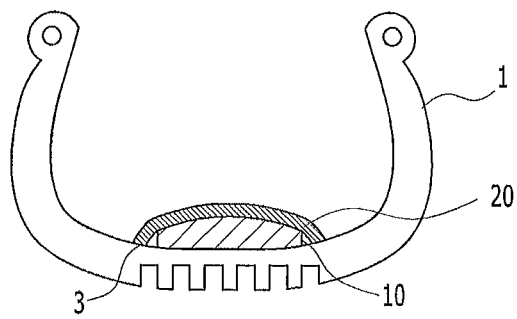
Figure 1C:
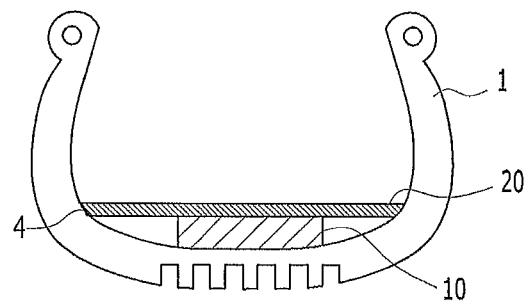

FIGS. 1A-1C are cross-sectional views illustrating noise-reducing apparatuses for a tire having a sound-absorbing foam attached to the tire using a fixing band attached at different positions, according to various embodiments of the disclosed technology. Referring to FIG. 1B, in an embodiment of the disclosed technology, an attaching portion can attach and fix a sound-absorbing foam at both sides of shoulder 3 in a tire. Further, referring to FIG. 1A, in another embodiment of the disclosed technology, an attaching portion 21 can attach and fix the sound-absorbing foam 10 at both sides of an inner liner 2 of a tire. Further, referring to FIG. 1C, in yet another embodiment of the disclosed technology, an attaching portion 21 can attach and fix the sound-absorbing foam 10 at both sides of a sidewall 4 of a tire. However, it is preferable that the attaching portion is attached to the shoulder 3, as shown in FIG. 1B to ensure sufficient reliability for mounting by stably keeping the sound-absorbing foam in contact with the inner side of a tire, but the disclosed technology is not limited thereto.

Figure 8A:
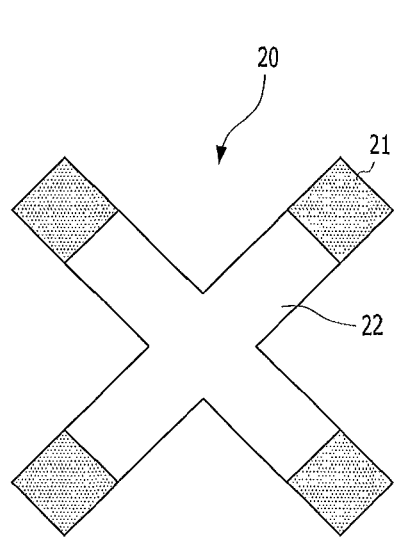
FIGS. 8A-8B are plan-view illustrations of a fixing band having specific shapes according to embodiments.
Figure 8B:
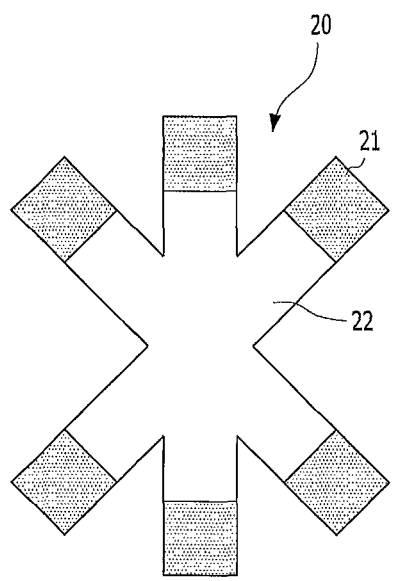
Figure 9A:
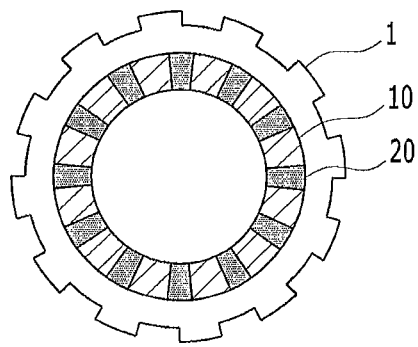
FIGS. 9A-9D are cross-sectional views illustrating tires having noise-reducing apparatuses, according to embodiments.
Figure 9B:
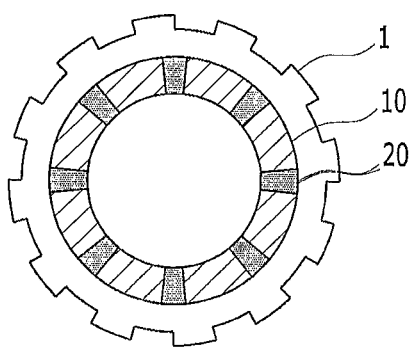
Figure 9C:
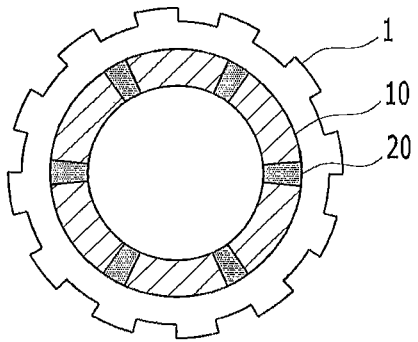
Figure 9D:
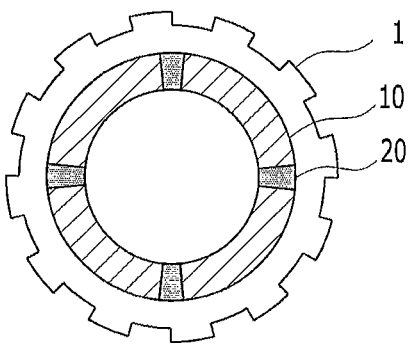

Referring back to FIGS. 2A-2C, the fixing band 20 extends in a predetermined direction and may have various shapes including an ellipse, a rectangle, and a concave shape. As shown in FIGS. 2A-2C, the fixing band 20 has the attaching portion 21 at both sides and the pressing portion 22 is formed between the attaching portions 21, so the sound-absorbing foam is inserted under the pressing portion 22 from a side of the pressing portion 22. In detail, in the fixing band 20 that is a single member, the portion that is brought in contact with the inner side of a tire may be called the attaching portion 21 and the portion that presses down the sound-absorbing foam 10 by expanding and contracting in contact with the sound-absorbing foam 10 may be called the pressing portion (that is, the portion of the fixing band 20 except the attaching portion 21 can be called the pressing portion 22). Further, the attaching portion 21 and the pressing portion 22 may be separately formed and attached or integrated with each other. Further, referring to FIGS. 8A and 8B, the shape of the fixing band is not limited to an ellipse, a concave shape, and a rectangle. As shown in FIGS. 8A and 8B, the fixing band may be formed in the shapes of "X", "*", or "+". Further, in the fixing band 20 having these shapes, it should be understood that an attaching portion is formed at ends of the fixing band 20 and the sound-absorbing foam 10 is inserted under the exposed portion of a side of the pressing portion 22.

The fixing band 20 is supposed to have at least two attaching portions 21 at both sides from the pressing portion 22. That is, the fixing band 20 of the disclosed technology uses flexibility of the pressing portion 22 between the attaching portions 21 at both ends with the attaching portions 21 fixed to the inner side of a tire. In other words, the attaching portions 21 are formed at predetermined portions of the edge of the fixing band 20. For example, when the fixing band 20 is formed in a rectangular shape (FIG. 2A), the attaching portions 21 may be formed at the areas around the two shorter sides (both sides of the band), in which the areas around the two longer sides are not bonded to the inner side of a tire and open, thereby providing an entrance for installing a sound-absorbing foam.

Figure 11A:
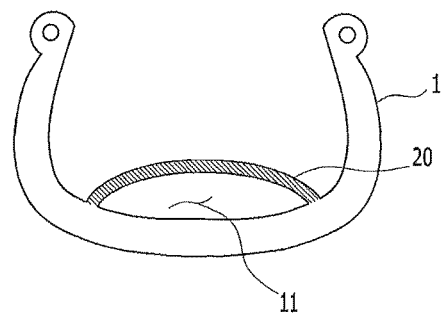
FIGS. 11A-11C are cross-sectional views illustrating a manufacturing method of tires having fixing bands, according to embodiments.
Figure 11B:
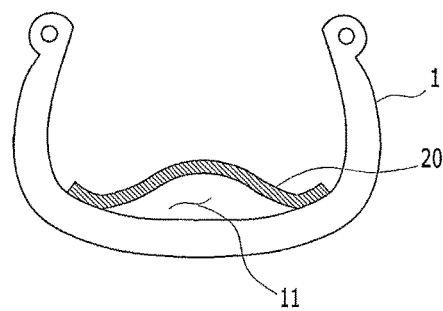
Figure 11C:
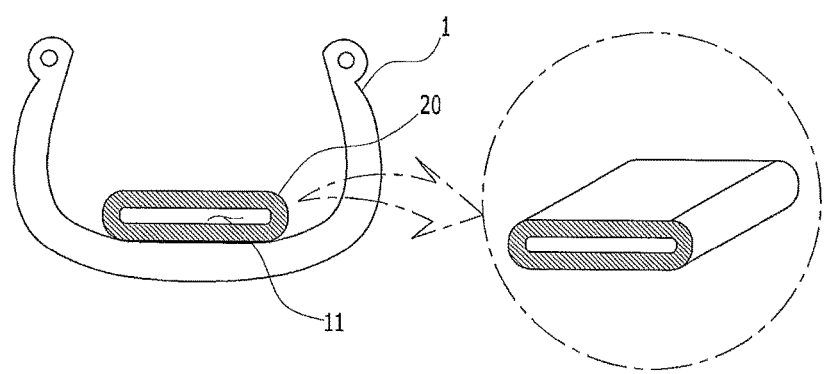

Further, a fixing band according to an embodiment of the disclosed technology may be formed in the shape of a pocket, as shown in FIG. 11C. As shown in FIG. 11C, a pocket-shaped fixing band 20 has a cavity having a predetermined size therein and the sound-absorbing foam 10 can be inserted into the cavity. Similarly, the pocket-shaped fixing band 20 may be made of an extendable material and has a bottom that is the attaching portion to be attached to the inner side of a tire, in which the portion except the cavity and the attaching portion may be a pressing portion.

Embodiments according to arrangement structure of a plurality of fixing bands of the disclosed technology are shown in FIGS. 3A to 7B.

Figure 3A:
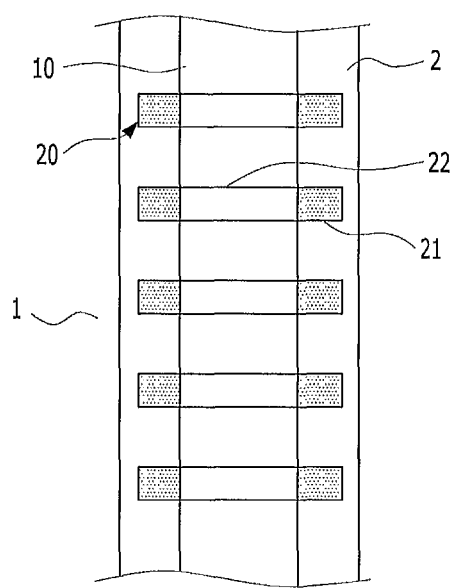
FIGS. 3A-3B are plan-view illustrations of a plurality of fixing bands, according some embodiments.
Figure 3B:
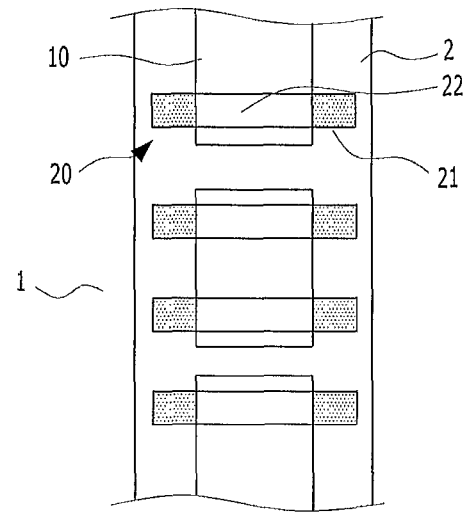

Referring to FIG. 3A-3B first, a plurality of fixing bands 20 having the a '−' shape may be fixed to the inner side of a tire with a predetermined gap therebetween and a sound-absorbing foam may be inserted and attached under the pressing portions 22 of the fixing bands 20. According to an embodiment of the disclosed technology, as shown in FIG. 3A, a sound-absorbing foam 10 may be continuously attached in the circumferential direction of a tire under the pressing portions 22 of the fixing bands 20 fixed in a '−' shape, and as shown in FIG. 3B, a plurality of rectangular sound-absorbing foams 10 may be attached under the pressing portions 22 of a plurality of fixing bands 20 attached in a '−' shape.

Figure 4A:
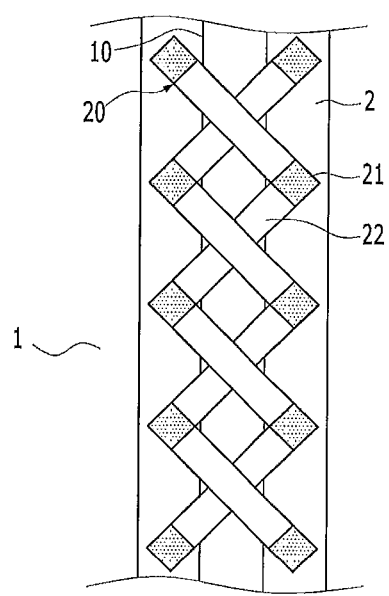
FIGS. 4A-4B are plan-view illustrations of a plurality of fixing bands, according some other embodiments.
Figure 4B:
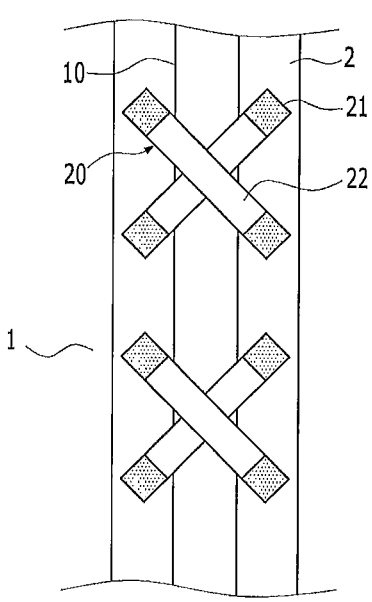

Further, referring to FIGS. 4A-4B, a plurality of fixing bands may be attached in an X-shape on the inner side of a tire. As shown in FIG. 4A, the fixing bands 20 fixed in an X-shape may share their attaching portions 21, and as shown in FIG. 4B, the fixing bands 20 may be independently fixed to the inner side of a tire in an X-shape without sharing their attaching portions 21. Further, referring to FIGS. 8A-8B, a fixing band 20 formed in an X-shape may be used, as shown in FIG. 8A, and a fixing band 20 extending in a predetermined direction may be attached in an X-shape, as shown in FIGS. 2A-2C. Further, it should be understood that, as shown in FIGS. 4A-4B, a sound-absorbing foam 10 may be continuously attached in the circumferential direction of a tire under the pressing portions 222 of the fixing bands, or as shown in FIG. 3B, a plurality of rectangular sound-absorbing foams 10 may be attached.

Figure 5:
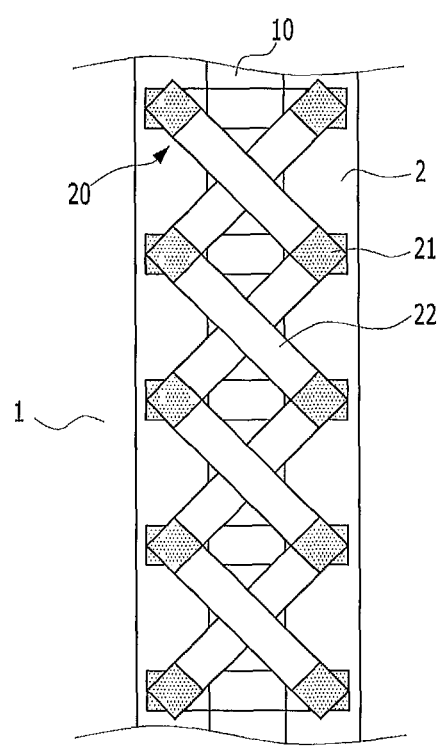
FIG. 5 is a plan-view illustration of a plurality of fixing bands, according some other embodiments.
Figure 6:
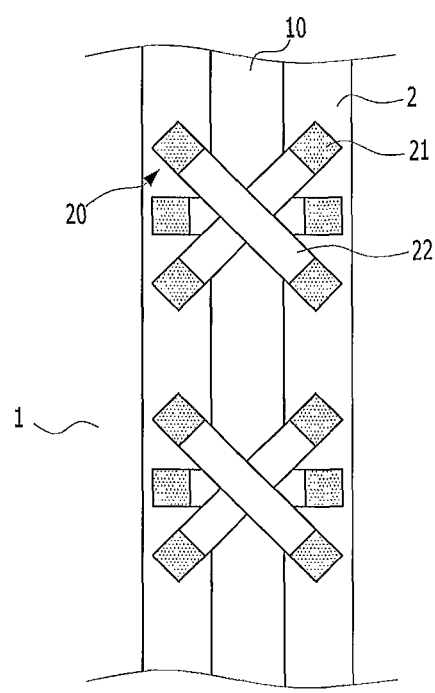
FIG. 6 is a plan-view illustration of a plurality of fixing bands, according some other embodiments.

Further, the embodiment shown in FIGS. 5 and 6 illustrate embodiments combining the embodiment having a '−' shape shown in FIGS. 3A-3B and the embodiment of attaching silent foam fixing bands in an X-shape shown in FIGS. 4A-4B. For stronger pressing force, silent foam fixing bands 20 may be attached in the shape shown in FIGS. 5 and 6, which can apply stronger pressing force to the silent foam 10.

Figure 7A:
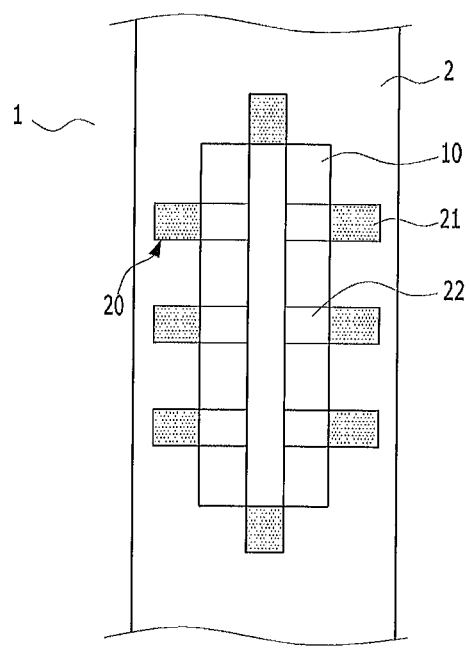
FIGS. 7A-7B are plan-view illustrations of a plurality of fixing bands, according some other embodiments.
Figure 7B:
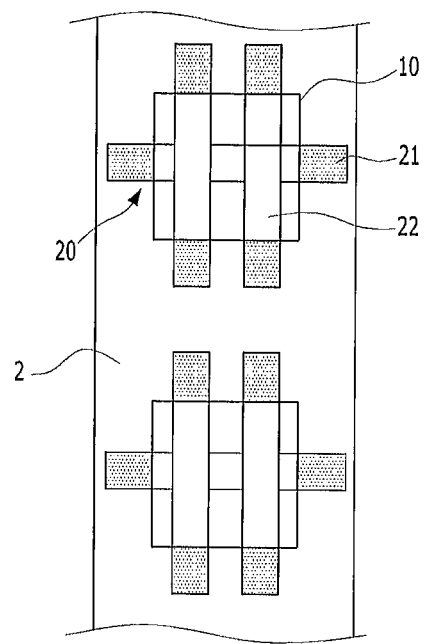

Further, as shown in FIGS. 7A-7B, the silent foam fixing band 20 may have a '+' shape in order to attach a plurality of rectangular silent foams 10. FIG. 7A shows an embodiment when the longer sides of a rectangular silent foam 10 are arranged in the circumferential direction and FIG. 7B is an embodiment when the longer sides of a rectangular silent foam 10 are arranged along the width of an inner liner 2.

Figure 10:
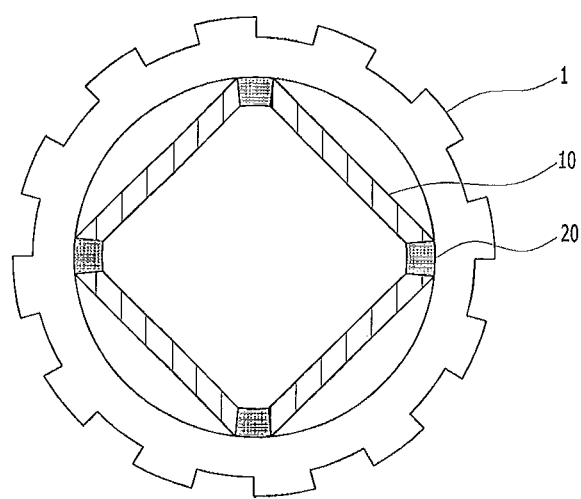
FIG. 10 is a cross-sectional view illustrating a tire having a noise-reducing apparatus, according to embodiments.

FIGS. 9A-9D are cross-sectional views illustrating tires having noise-reducing apparatuses according to the disclosed technology. FIGS. 9A-9D show cross-sectional views of a tire when silent foam fixing bands are arranged with regular angular intervals of 30°, 45°, 60°, and 90°. In a noise-reducing apparatus for a tire with a silent foam 10 attached by a plurality of silent foam fixing bands 20 according to an embodiment of the disclosed technology, a plurality of silent foam fixing bands may be arranged with regular angular intervals of 5 to 180 degrees in the circumferential direction of a tire. More preferably, the regular angular intervals of a plurality of noise-reducing apparatus for a tire s may be 30 to 60 degrees. This is because efficiency of work and reliability of mounting a silent foam can be sufficiently ensured when the angular intervals are 30 to 60 degrees, but the disclosed technology is not limited thereto. Further, the noise-reducing apparatus for a tire may influence the moment of inertia of a tire, so if the silent foam fixing structures are asymmetrically arranged, balance of a tire cannot be ensured. Accordingly, it is preferable to arrange noise-reducing apparatuses with regular angular intervals. Further, when the gap between noise-reducing apparatuses exceeds 90 degrees, it may be difficult to bring the sound-absorbing foam 10 in contact with the surface of an inner liner 2 only with a plurality of fixing bands 20. Accordingly, when the gap between adjacent fixing bands exceeds 90 degrees, it may be preferable to ensure sufficient contact force between the sound-absorbing foam 10 and the surface of the inner liner 2 of a tire by applying an adhesive to a portion of the fixing band 20 or the sound-absorbing foam 10. However, according to embodiments of the disclosed technology, as shown in FIG. 10, even if the sound-absorbing foam 10 is partially separated from the surface of the inner liner 2, it is fixed by the fixing bands 20, so it is possible to prevent the sound-absorbing foam 10 from being fully separated from the surface of the inner liner 2 and reducing the rotational ability of the tire 1 by rotating in the cavity of the tire 1.

The fixing band 20 is made of an extendable material, so the pressing portion 22 may change in length in the extension direction when the sound-absorbing foam 10 is fixed (installed state) or when the sound-absorbing foam is not fixed yet or has been removed after fixed (separated state). The material of the fixing band 20 is considered as an elastic material, has a specific modular ratio, and generates a contractive force in proportion to the extension distance in the extension direction (Hook's law), so when the sound-absorbing foam is installed, the contractive force becomes strong pressing force that is applied to the top of the sound-absorbing foam 10 by the fixing band 20.

Further, when the modular ratio of the material of the fixing band 20 is large, it may be difficult to install the fixing band 20 because a large force is required to extend the fixing band 20. Further, when the modular ratio of the fixing band 20 is small, it may be impossible to install the sound-absorbing foam 10, so the length difference after and before the sound-absorbing foam 10 is installed should be considered.

The attaching portion 21 may be formed in various shapes and sizes, but it should be considered that the larger the contact area with the inner side of a tire of the attaching portion 21, the more the coupling force between the inner side of the tire and the sound-absorbing foam 10 can be increased, when determining the shape and size. Further, if the pressing portion 22 is increased in size, the attaching portion 21 also should be increased in size.

According to the embodiment shown in FIG. 11A, the attaching portion 21 is integrated with the inner side of a tire, so when seen from the outside, there may not be a step between the inner side of the tire and the top of the attaching portion 21. This is an embodiment when the fixing band 20 and the inner side of a tire are coupled by vulcanization, in which the portion that will be the attaching portion 21 before vulcanization is melt and integrated with the inner surface of a tire during vulcanization. Accordingly, it should be understood that the attaching portion 21 exists even in this embodiment.

The thickness of the fixing band 20 may be designed to be uniform, but if a specific portion further extends than other portions for the structure, the portion may be set thicker, and in contrast, if a specific portion less extends than other portions, the portion may be set thicker.

The material of the fixing band 20 may be at least one or more homopolymers selected from a group of EVA (Ethylene vinyl acetate), synthetic resin, natural resin, and urethane, or copolymers of monomers of them. Further, latex may be used. It is required to design the composition of the fixing band 20 in order to keep predetermined elasticity.

Referring back to FIG. 1, a noise-reducing apparatus for a tire of the disclosed technology may be applied to the inner side of a tire, that is, the sidewall 4, the shoulder 3, and the inner liner 2 and the thickness of the fixing band 20 may be 20 to 120% of the thickness of the inner liner 2. Considering that the thickness of the inner liner 2 of a common 16 inch tire is 1.5 mm, when the thickness is less than 20%, the thickness of the fixing band is too small, so a problem may be generated with durability for example breaking of a sound-absorbing foam 10 when the sound-absorbing foam 10 is inserted. Further, when the thickness is larger than 120%, the weight increase at the corresponding portion exceeds an ignorable level when or after the sound-absorbing foam 10 is attached, so non-uniform centrifugal force may be partially generated and wear of the tire may be caused. Further, the fixing band 20 may have a width of 0.5 to 30 mm, but it is not limited thereto.

Further, when the fixing band 20 is formed on the inner liner 2, the material of the fixing band 20 may be the same as that of the inner liner 2, which is determined in consideration that when the fixing band 20 and the inner liner 2 are attached or integrated by particularly vulcanization, as described above, it is possible to maximize the coupling effect even without using a specific adhesive.

Next, a method of manufacturing a noise-reducing apparatus for a tire of the disclosed technology including the process of combining the fixing band 20 and the inner side of a tire will be described.

The process of combining the fixing band 20 and the inner side of a tire may be composed of a combining process, a bonding process, or a fusing process. The bonding process uses an adhesive having a predetermined composition and the fusing process partially melts a predetermined portion of the inner side of a tire by heating it and then bonding an attaching portion 21 to the predetermined portion inside the tire under pressure. The composition of the adhesive to be used or the melting temperature in the fusing process should be selected differently in accordance with the composition of the inner side of a tire or the composition of a fixing band 20.

The attaching portion 21 and the inner side of a tire may be attached or integrated by vulcanization. Vulcanization is a process of putting a non-vulcanized green tire into a vulcanizing mold, and forming a tire in a predetermined shape and ensuring required properties of the tire by applying heat and pressure, and can be used to combine the fixing band 20 and the inner side of a tire in the disclosed technology.

Before vulcanization, the fixing band 20 and the inner side of the tire may be prepared by physically abutting (non-contact type), but it may be possible to temporarily bond the attaching portion 21 to the inner side of the tire using a predetermined adhesive. Further, it may be possible to put an anti-pressing portion-tire attachment structure 30 under a pressing portion 22 before vulcanization in order to prevent the surface of the pressing portion 22 of a fixing band 20 and the inner side of a tire from being attached to each other. The anti-pressing portion-tire attachment structure 30 should be made of a high-temperature polymer of which at least the surface is not melted at the temperature for vulcanization.

Figure 12A:
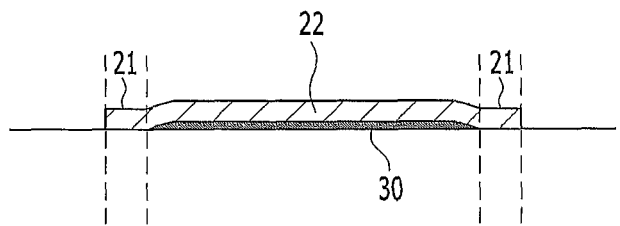
FIGS. 12A-12C are cross-sectional views illustrating a film-type anti-pressing portion-tire attachment structures, according to embodiments of fixing structures.
Figure 12B:
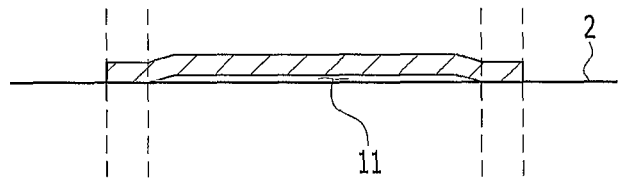
Figure 12C:
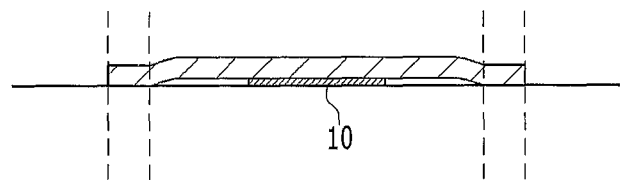
Figure 13A:
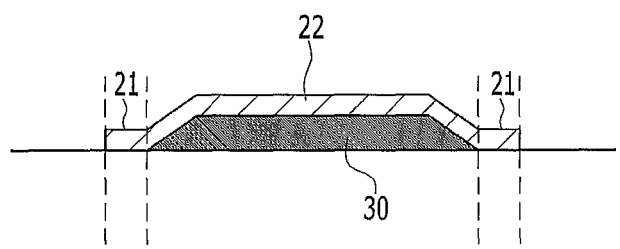
FIGS. 13A-13C are cross-sectional views illustrating 3D anti-pressing portion-tire attachment structures, according to embodiments of the noise-reducing apparatus for a tire.
Figure 13B:
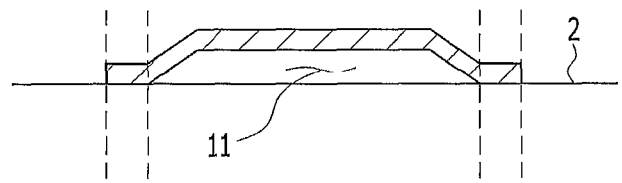
Figure 13C:
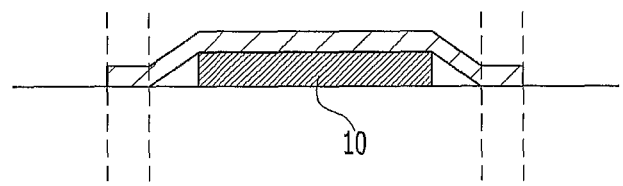

Referring to FIG. 12A, the anti-pressing portion-tire attachment structure 30 may be a thin film, in which it is possible to minimize the initial length of a pressing portion 22 in the extension direction and this embodiment may be applied when a sound-absorbing foam 10 to be used is thin. In contrast, referring to FIG. 12A, when a selected sound-absorbing foam 10 is thick, an anti-pressing portion-tire attachment structure 30 having a 3D shape with a predetermined height may be used. This is because when the film-shaped anti-pressing portion-tire attachment structure 30 is used, the deformation amount (length) of the pressing portion 22 is too large and the fixing band 20 breaks or a sound-absorbing foam 10 may not be installed.

The thickness of the anti-pressing portion-tire attachment structure 30 may be 20 to 50% of the thickness of the sound-absorbing foam 10. When the thickness of larger than 50% of the thickness of the sound-absorbing foam, non-uniform pressure may be applied, and when it is less than 20%, the fixing band 20 too much extends while the sound-absorbing foam 10 is inserted, so the sound-absorbing foam 10 may break.

Further, the anti-pressing portion-tire attachment structure 30 should be removed after the attaching portion 21 of the fixing band 20 is attached to the inner side of a tire by vulcanization, but it may be removed any time before the sound-absorbing foam 10 is installed.

In short, the process of combining an attaching portion 21 and the inner side of a tire using vulcanization includes a vulcanization-preparing step and a vulcanizing step, and the anti-pressing portion-tire attachment structure 30 is installed between the pressing portion 22 and the inner side of the tire before the vulcanizing step.

FIGS. 11A-11B are cross-sectional views of tires where a fixing band is attached through the process. First, an embodiment when an attaching portion 21 and the inner side of a tire are completely thermally bonded in a single unit by vulcanization is shown in FIG. 11A. According to the embodiment shown in FIG. 11A, since the attaching portion 21 of a fixing band 20 is completely integrated with the inner side of the tire, a stronger fixing force can be ensured and high reliability of mounting a sound-absorbing foam 10 can be achieved. Further, if the vulcanization conditions are changed, as shown in FIG. 11B, it is also possible to attach the fixing band 20 to the inner side of the tire with a predetermined step between the inner side of the tire and the top of the attaching portion 21 by thermally bonding the lower end of the attaching portion to the inner side of the tire.

Further, according to the embodiment shown in FIG. 11C, a pocket-shaped fixing band 20 can be vulcanized to the inner side of a tire. As shown in FIG. 11C, the pocket-shaped fixing band 20 has a cavity having a predetermined size therein and the sound-absorbing foam 10 can be inserted and attached in the cavity. Further, it should be understood that the pocket-shaped fixing band 20 may be attached to the inner side of the tire without a step between the inner side of the tire and the top of the attaching portion 21 through vulcanization, depending on the conditions of the vulcanization.

Hereinafter, the use of a noise-reducing apparatus for a tire of the disclosed technology is described.

First, the fixing band 20 is extended upward by applying force to the pressing portion 22. Before this step, a step of applying a permanent- or temporal-fixing adhesive to a portion of a sound-absorbing foam or the fixing band 20 may be further included. The adhesive force of the temporal-fixing adhesive does not need to be strong, but an adhesive with strong adhesive force may be used to permanently fix the sound-absorbing foam 10 to the inner side of a tire. When an adhesive is additionally applied, the adhesive force of the adhesive is added to the pressing force by the fixing band 20, so the sound-absorbing foam can be more firmly mounted. In particular, as described above, the gap between fixing bands exceeds 90 degrees, a step of applying an adhesive may be further included.

Second, the sound-absorbing foam 10 is put under the pressing force 22 by inserting the sound-absorbing foam 10 from a side of the extended fixing band 20.

Third, the force extending upward the fixing band 20 is removed so that the fixing band 20 contracts and the pressing portion 22 presses down the sound-absorbing foam 10.

Fourth, the fixing band 20 is kept in contact with the sound-absorbing foam 10 and the inner side (e.g., inner liner 2) of the tire.

Fifth, a fixing band 20 adjacent to the fixing band 20 are extended upward and the sound-absorbing foam 10 under the fixing band 20 is pulled with a predetermined force, thereby positioning the sound-absorbing foam 10 under the pressing portion 22 of the adjacent fixing band 20.

These steps are repeated so that the sound-absorbing foam 10 can be attached circumferentially throughout the tire.

According to the disclosed technology, it is possible to attach a sound-absorbing foam without forming a sealant layer that provides adhesion to attach a sound-absorbing foam in a tire, so it is possible to improve work efficiency, as compared with attaching a sound-absorbing foam with a sealant or an adhesive, which is the first effect. Further, since a sound-absorbing foam is fixed by an elastic band, it is possible to strongly fix the sound-absorbing foam without damaging a tire, which is the second effect. Furthermore, since a sound-absorbing foam is kept in contact with the inner side of a tire by the fixing band, it is possible to solve the problem that a sound-absorbing foam is separated from the inner side of a tire, which is the third effect. Further, the materials used for adhesive layers or sealant layers are environmental-harmful materials, so use of the materials is limited; however, according to the disclosed technology, it is possible to strongly attach a sound-absorbing foam even without using those materials, which is advantageous for the environment.

The effects of the disclosed technology are not limited to those described above and should be construed as including all of effect that can be inferred from the configuration of the disclosed technology described in the detailed description or claims.

The above description is an example of the disclosed technology and those skilled in the art may understand that the disclosed technology may be easily modified in other ways without changing the necessary characteristics or the spirit of the disclosed technology.

Therefore, it should be understood that the exemplary embodiments are not limiting but illustrative in all aspects. For example, the single components may be divided, respectively, and the separate components may be combined.

The scope of the disclosed technology is defined by the following claims, and all of changes and modifications obtained from the meaning and range of the claims and equivalent concepts should be construed as being included in the scope of the disclosed technology.

What is claimed is:

1. A noise-reducing apparatus for a tire, comprising:
a sound-absorbing foam configured to reduce noise generated by the tire by absorbing sound generated by the tire in motion when attached to an inner liner of a tire; and
a plurality of fixing bands formed of an elastic material and configured to fix the sound-absorbing foam to an inner side of the tire, wherein each of the fixing bands has attaching portions configured to be fixed to the inner side of the tire and has a pressing portion configured to bring and keep the sound-absorbing foam in contact with the inner liner,
wherein the attaching portions are formed at opposing sides of the fixing band and configured to be attached to both shoulders in the tire, both sides of the inner liner or both inner sidewalls of the tire,
wherein the pressing portion is formed between the attaching portions and configured to apply an elastic force on the sound-absorbing foam to press down and fix the sound-absorbing foam to the inner side of the tire by extending and contracting in contact with the sound-absorbing foam, and
wherein the sound-absorbing foam is configured to be inserted under the pressing portion from a side of the pressing portion.

2. The noise-reducing apparatus of claim 1, wherein the sound-absorbing foam is continuously attached circumferentially throughout the inner liner.

3. The noise-reducing apparatus of claim 1, wherein two or more sound-absorbing foams are attached circumferentially to the inner liner.

4. The noise-reducing apparatus of claim 1, wherein a plurality of fixing bands is attached around the inner side of the tire and having regular angular gaps between adjacent ones of the fixing bands that are between about 5° and about 180°.

5. The noise-reducing apparatus of claim 1, wherein the attaching portions are configured to fix the sound-absorbing foam by attaching to the both sides of the inner liner of the tire.

6. The noise-reducing apparatus of claim 1, wherein the attaching portions are configured to fix the sound-absorbing foam by attaching to the both shoulders in the tire.

7. The noise-reducing apparatus of claim 1, wherein the attaching portions are configured to fix the sound-absorbing foam by attaching to the both inner sidewalls of the tire.

8. The noise-reducing apparatus of claim 1, wherein the fixing bands have a shape of any one of an ellipse, a circle, a concave shape and a rectangle.

9. The noise-reducing apparatus of claim 1, wherein the fixing bands are formed of one or more homopolymers selected from the group consisting of ethylene vinyl acetate (EVA), synthetic resin, natural resin and urethane, or formed of one or more copolymers having monomers of the one or more homopolymers.

10. The noise-reducing apparatus of claim 1, wherein the fixing bands are made of the same material as the inner liner.

11. The noise-reducing apparatus of claim 1, wherein the fixing bands have a width of 0.5 mm to 30 mm and a thickness that is 20% to 120% of the thickness of the inner liner.

12. The noise-reducing apparatus of claim 1, wherein the attaching portions and the inner side of the tire are integrated by a bonding process or a fusing process.

13. The noise-reducing apparatus of claim 1, wherein the attaching portions the inner side of the tire are integrated by vulcanization, and
an anti-pressing portion-tire attachment structure is provided between the pressing portion and the inner side of the tire before vulcanization, such that contacting surfaces of the pressing portion and of the inner side of the tire are prevented from being attached to each other in the attaching portions integrated in the inner side of the tire.

14. The noise-reducing apparatus of claim 13, wherein the anti-pressing portion-tire attachment structure is formed of a high-temperature polymer that does not melt at a temperature sufficient to integrate the attaching portions and the inner side of the tire by vulcanization.

15. A method of integrating the noise-reducing apparatus of claim 1 to a tire, the method comprising:
i) extending one of the fixing bands outward relative to the surface of the inner side of the tire by applying an outward force to the pressing portion;
ii) placing the sound-absorbing foam under the pressing portion;
iii) applying a pressing force to the sound-absorbing foam by contracting the one of the fixing bands by removing the outward force extending the one of the fixing bands;
iv) keeping the one of the fixing bands in contact with the sound-absorbing foam and the inner side of the tire; and
v) positioning the sound-absorbing foam under the pressing portion of an adjacent one of the fixing bands by extending the adjacent one of the fixing bands outward relative to the surface of the inner side of the tire by applying an outward force to the pressing portion of the adjacent one of the fixing bands,
wherein extending one of the fixing bands, placing the sound-absorbing foam, applying the pressing force, keeping the one of the fixing bands in contact and positioning the sound-absorbing foam are repeated until the sound-absorbing foam is attached circumferentially throughout the tire.

16. The method of claim 15, further comprising applying a temporal- or permanent-fixing adhesive to a portion of the one of the fixing bands or the sound-absorbing foam before the step i).

17. A tire having integrated therein the noise-reducing apparatus of claim 1.

* * * * *

UNITED STATES PATENT AND TRADEMARK OFFICE
CERTIFICATE OF CORRECTION

PATENT NO. : 10,259,271 B2
APPLICATION NO. : 15/364116
DATED : April 16, 2019
INVENTOR(S) : Soon Hong So It is certified that error appears in the above-identified patent and that said Letters Patent is hereby corrected as shown below:

On the Title Page

Column 2, Item (56), Line 13, under Other Publications, after "Action" insert --received January 16, 2017--.

In the Specification

In Column 6, Line 12, change "FIG." to --FIGS.--.

In the Claims

In Column 12, Line 11, Claim 13, after "portions" insert --and--.

Signed and Sealed this
Fifth Day of November, 2019

Andrei Iancu
*Director of the United States Patent and Trademark Office*